(No Model.)
A. T. ATHERTON.
BEATER FOR MACHINES FOR OPENING COTTON.
No. 590,560. Patented Sept. 28, 1897.
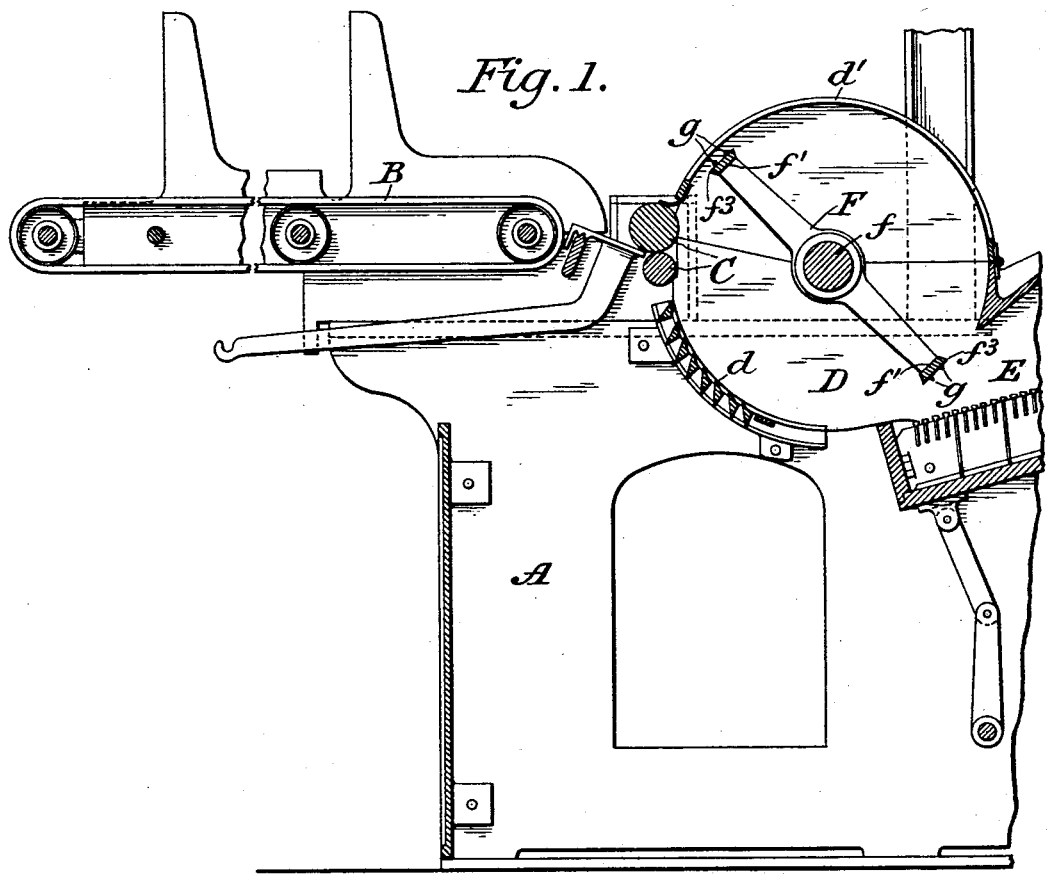
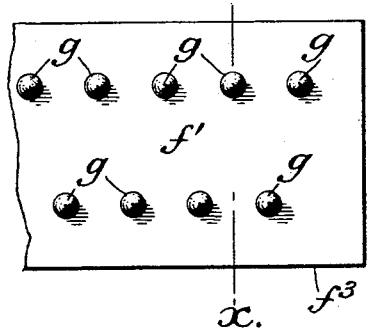
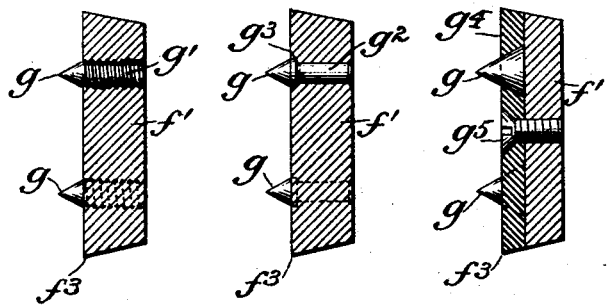

UNITED STATES PATENT OFFICE.

ABEL T. ATHERTON, OF WARWICK, RHODE ISLAND.

BEATER FOR MACHINES FOR OPENING COTTON.

SPECIFICATION forming part of Letters Patent No. 590,560, dated September 28, 1897.

Application filed February 6, 1897. Serial No. 622,272. (No model.)

*To all whom it may concern:*

Be it known that I, ABEL T. ATHERTON, a citizen of the United States, and a resident of Warwick, in the county of Kent and State of Rhode Island, have invented certain new and useful Improvements in Beaters for Machines for Opening Cotton and other Materials, of which the following is a specification.

In the construction of beaters of the class to which my invention relates two flat bars or "blades," as they are usually called, are disposed on opposite sides of the axis of a supporting-shaft in parallel relationship thereto and are firmly secured to and fixedly held at the same distance from such shaft by arms extending outward radially therefrom. As thus constructed these beaters in practice are located in rear of the first or other pair of feed-rolls of the picker or other form of machine in such a position with respect thereto as to bring the outer limit of their paths of rotation into close proximity to the peripheries thereof, and as thus disposed they operate upon the cotton or other material fed to them with a rapid beating action, which not only opens it up into a light flaky mass, but also removes therefrom all seeds, motes, and other refuse with which it may be contaminated. In some instances the blades of these beaters have been made of a form that is rectangular in cross-section, but these, while operative to a certain extent, have not generally proved efficient, principally because of the fact that the edges of the blades which acted upon the cotton or other material being formed by the intersection of two planes at right angles to each other were too blunt to take the proper hold thereon, and as a result thereof the material operated upon was not properly opened up or the seeds and other refuse removed therefrom. In other instances these blades have been provided with operative edges that were made sharper and more acute by beveling the former back from their faces to their rears, but these, while operating with efficiency upon the cotton or other material when fed evenly thereto, have likewise proved defective in practice when this feeding has not been evenly effected, as the feed-rolls in such cases do not maintain a uniform hold upon the cotton or other material throughout their lengths, and as a consequence large masses of the cotton or other material in an unopened condition is frequently drawn in between them thereby and passed on through the machine in that state, rendering the finished product of an inferior quality. To obviate this objection and provide a beater that shall insure the perfect and efficient opening up of the cotton or other material and the removal of all seeds and other impurities therefrom at all times are the objects of my invention.

To these ends the invention consists, first, in the peculiarities of construction of the beater itself, whereby the objects mentioned are attained, and, second, in the combination of a beater as thus constructed with the several parts with which it coöperates, all as will hereinafter more fully appear.

Referring to the accompanying drawings, which form a part of this specification, Figure 1 is a vertical longitudinal section of a cotton opener or picker with a beater constructed in accordance with my invention applied in connection therewith; Fig. 2, a plan of a portion of a blade of a beater involving my invention; and Figs. 3, 4, and 5 transverse sections, respectively, of various modifications thereof, taken in the plane $x$ $x$ of Fig. 2.

In the several figures like letters of reference indicate corresponding parts.

A indicates the framework or housings; B, the feeding-apron upon which the cotton or other material to be treated is supplied; C, the initial set of feed-rolls through which the material supplied to the feeding-apron is fed to the beater; D, the beater-chamber provided with the curved gird $d$ in its under side and with a swinging cover $d'$ on its upper side, and E the trunk through which the cotton acted upon and opened up by the beater is carried forward to the condensing-cylinders or cages or other point required, all as is common to cotton openers and pickers of a well-known construction and require no further description herein.

Located within the beater-chamber D is the beater F, to which my invention more particularly relates. This beater consists of the usual supporting-shaft $f$, which is mounted in suitable bearings on the framework or housings of the machine, whereby to be capable of rotation therein, and is provided with the blades $f'$, that are disposed on opposite sides of its axis in parallelism therewith and firmly held in those relations by arms $f^2$, extending outward radially therefrom in opposite directions, as shown. In the construction of these blades $f'$ various forms may be adopted. I prefer, however, to construct them of a trapezoidal form in cross-section with the sides constituting their backs shorter than the sides constituting their faces, whereby to impart to them sharp outer edges $f^3$ that are somewhat less than right angles for operating upon the cotton or other material that may be subjected to their action. As thus constructed these blades are provided with series of pins or teeth $g$, projecting outward slightly from their faces, whereby to comb out and partially open up the cotton or other material fed to the beater before it is brought into contact with the edges $f^3$ thereof, and in order to effect this result with the greatest efficiency I find it desirable to arrange them in longitudinal rows. In some cases, when thus arranged, it may be found desirable to dispose the individual pins or teeth of one row opposite the individual pins or teeth of the adjoining row, but my preference is to so dispose them as to bring the individual teeth of the one row opposite the spaces between the individual teeth of the other row, as shown in the drawings. The form of these pins or teeth will be such as best suits them to the material upon which they are to operate. For operating and cleaning raw cotton, however, the form I have found to give the best results is that of a cone, which tapers abruptly from its base to its point or apex, and this is the form I prefer to use in practice. When thus constructed, their securement in place may be accomplished in various ways. In some instances it may be found desirable to effect this result by threading the portions $g'$ thereof below their conical ends and inserting the portions thus threaded into correspondingly-shaped threaded orifices formed in the blades $f'$, as shown in Fig. 3. In other instances it may be found convenient to provide them with shanks $g^2$ of a reduced diameter and insert such shanks in properly-shaped orifices formed in the blades $f'$, with the shoulders $g^3$ thereon resting in counterbored seats, with which the blades may be provided, and with their inner ends upset or riveted down, as illustrated in Fig. 4, while in still other instances it may be preferred to make them in the form of enlarged cones, with no threaded portions or stems, and clamp them in place upon the faces of the blades $f'$ by plates $g^4$, secured thereto by screws $g^5$ and provided with suitably-shaped orifices, through which they pass and in which they are held, as shown in Fig. 5. Any of these securing means may be adopted, as preferred or as the exigencies of the use may demand, and the machine operate with equal efficiency, it only being essential that, whatever the means selected for their securement may be, the points of the pins or teeth all project to substantially the same distance from the faces of the beater-blades and that they be held securely in place.

With a beater constructed as above set forth its arrangement with respect to the feed-rolls C will be such as to bring the outer limit of travel of the points of the pins or teeth $g$ into close proximity to the peripheries thereof, and in its operation the cotton or other material fed to it will first receive a combing action by said pins or teeth and be thereby partially opened up before it is brought into contact with the sharp edges $f^3$ of the beater-blades to receive the requisite beating and cleaning action therefrom. By thus employing the pins or teeth with the beater-blades, as will be seen, I not only subject the cotton or other material to the usual beating and cleaning action incident to the use of beaters as heretofore constructed, but also to a combing action prior thereto, the result of which is to so open up the cotton or other material delivered to the beater as to render it impossible for the sharp edges $f^3$ of the beater-blades to secure such a hold thereon as to enable it to draw in between the feed-rolls any portion thereof even when imperfectly held thereby.

Although in the foregoing I have described the best means contemplated by me for carrying my invention into practice, I wish it distinctly understood that I do not limit myself strictly thereto, but reserve to myself the right to modify the same in various ways without departing from the spirit thereof.

Having now described my invention and specified certain of the ways in which it is or may be carried into effect, I claim and desire to secure by Letters Patent of the United States—

1. A beater for machines for opening cotton and other materials, consisting of a supporting-shaft, blades provided with operative edges the angles formed by the intersection of whose sides are less than right angles, arms for securing the blades to and supporting them from the said shaft, and longitudinal rows of conical pins or teeth projecting outwardly from the face of such blades, substantially as set forth.

2. The combination, with the feed-rolls of a machine for opening cotton or other materials, and means whereby such cotton or other material is supplied thereto, of a beater of the class described constructed with a supporting-shaft, blades provided with operative edges the angles formed by the intersection of whose sides are less than right angles, arms for securing the blades to and supporting them from the said shaft, and longitudinal rows of conical pins or teeth projecting outwardly from the face of such blades, substantially as set forth.

In testimony whereof I have hereunto affixed my hand this 4th day of February, 1897.

ABEL T. ATHERTON.

Witnesses:
CHARLES M. READ,
GEORGE H. WARE.